Figure 2:
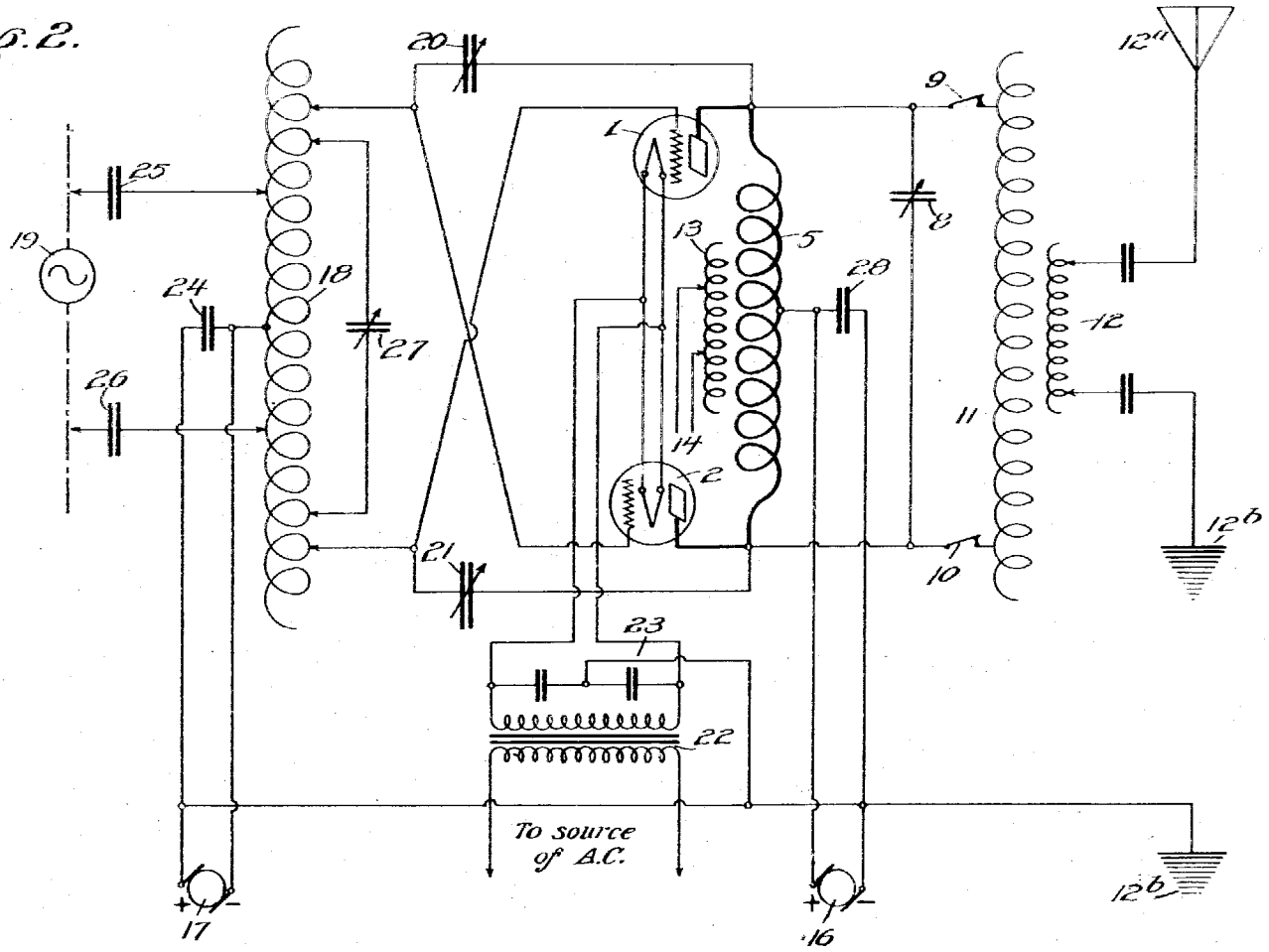

May 19, 1931. L. A. GEBHARD Re. 18,070

INDUCTANCE SYSTEM

Original Filed Dec. 22, 1928 2 Sheets-Sheet 1

<image_rotation value="270" box="0.208,0.300,0.772,0.764" kind="diagram" usefulness="9" />

Fig. 1.

Inventor
Louis A. Gebhard.

By Robert A. Lawrence

Attorney

May 19, 1931. L. A. GEBHARD Re. 18,070

INDUCTANCE SYSTEM

Original Filed Dec. 22, 1928 2 Sheets-Sheet 2

Inventor
Louis A. Gebhard.

By Robert A. Lawrence

Attorney

Reissued May 19, 1931

Re. 18,070

UNITED STATES PATENT OFFICE

LOUIS A. GEBHARD, OF WASHINGTON, DISTRICT OF COLUMBIA, ASSIGNOR TO WIRED RADIO, INC., OF NEW YORK, N. Y., A CORPORATION OF DELAWARE

INDUCTANCE SYSTEM

Original No. 1,753,408, dated April 8, 1930, Serial No. 327,988, filed December 22, 1928. Application for reissue filed March 14, 1931. Serial No. 522,709.

My invention relates to inductance systems in general and more specifically to inductance systems employed in thermionic tube transmitters.

An object of my invention is to provide an inductance system for high frequency transmitters of the type employing thermionic tubes having the anodes thereof cooled by a circulatory liquid.

Another object of my invention is to provide an inductance system wherein the high frequency output circuit includes the circulatory system of the cooling fluid.

Still another object of my invention is to provide an inductance system wherein the cooling fluid circulates through the high frequency inductance of an electrically balanced thermionic tube transmitting system.

A further object of my invention is to provide an inductance system including a fluid cooled portion and an auxiliary portion adapted to be connected in circuit therewith with means for electrically coupling a load to the fluid cooled portion or to the auxiliary portion.

A still further object of my invention is to provide an inductance system including a fluid cooled dual passage tubular member having means for defining the radio frequency potential of the electrical center thereof including a radio frequency path to ground through a condenser.

A better understanding of the inductance system of my invention can be had by referring to the specification following and to the accompanying drawings wherein:

Figure 1 is a diagrammatic illustration showing the inductance system of my invention and Fig. 2 is a schematic circuit diagram showing the inductance system of my invention.

In transmitting systems employing thermionic tubes having their anodes cooled by a circulatory liquid it is essential to efficiency that the losses of high frequency energy in the cooling system be reduced to a minimum. With the connection of the cooling fluid to and from the thermionic tubes by means of an insulated length of tubing or hose, considerable loss of energy occurs. This is due primarily to the high potential of high frequency energy concentrated at the points of connection. The inductance system of my invention reduces these losses to a minimum and in addition provides many advantages, as will appear from the specification following:

Fig. 1 of the accompanying drawings is a diagrammatic illustration showing the inductance system of my invention. Thermionic tubes 1 and 2 are of the type adapted to have the anodes thereof cooled by a circulatory liquid. Tubes 1 and 2 are contained in receptacles or sockets 3 and 4 respectively. The cooling liquid is associated with thermionic tubes 1 and 2 by means of helical coil 5. Coil 5 comprises a length of metal having dual passage for conveying the cooling fluid to and from the respective tubes. Coil 5 is herein illustrated as comprising individual lengths of metal tubing which are placed parallel to each other and positioned in this manner by welding or other suitable means. This provides a single electrical conductor and a dual passage for the circulating liquid. The circulating liquid is associated with coil 5 by means of connectors $5^a$ and $5^b$ which conduct the liquid to and from the source of supply. Coil 5 is so designed that the frequency characteristics of the inductance thereof combined with the capacity of condenser 8 provides approximately the lowest frequency at which it is desired to operate the transmitter. The high frequency energy may be transferred to another circuit by inductance 13 which may be positioned in inductive relation to said coil 5 and electrically associated with the load circuit 14. Load circuit 14 may comprise a space radio radiating system, a wired radio system or additional thermionic tube amplifier circuits. Other coupling arrangements may be employed such as causing contact members $13^a$—$13^b$ to be connected either directly or capacitively to coil 5.

When it is desired to operate the transmitter on a frequency higher than that obtained by employing coil 5 and capacity 8 alone, an auxiliary inductance 11 is connected in parallel with coil 5 and capacity 8. This is accomplished by closing switch members 9 and 10. Should coil 5 and inductance 11 have like frequency characteristics the resultant frequency characteristics when the two are connected in multiple would be the sum of the two. Thus suppose the frequency characteristics of coil 5 and capacity 8 were such as to give an oscillation constant of 50 and that L was 10 and C was 5. Assuming that the frequency characteristics of inductance 11 were such as when employed with a capacity having a value of 5 would likewise give an oscillation constant of 50. If then inductance 11 is connected in parallel relation with coil 5 the resultant value of L would be 5 and the oscillation constant 25. A decrease in the oscillation constant is in effect an increase in the frequency characteristics of the circuit, as is well known in the art. It is further obvious that any frequency characteristics may be had by employing the well known elementary law for parallel inductances which formula is identical with that employed for parallel connection of resistances.

Fig. 2 is a schematic circuit diagram showing the inductance system of my invention employed in a representative amplifier circuit arrangement. Like reference characters are employed in this illustration. The anode circuits of thermionic tubes 1 and 2 are energized from source 16. Capacity 28 is connected to the mid-connection of coil 5 and to ground $12^b$.

The connection of the condenser 28 to ground $12^b$ provides a low impedance path for radio frequency currents and serves to establish a nodal point on the coil at the point where the liquid is introduced and discharged. In this way a low voltage condition exists at the point of admission and discharge of the fluid and the electrical center of the coil is fixed. The radio frequency potential at the electrical center of the coil is a minimum and admission or discharge of the cooling fluid may be effected with minimum losses. Inductance 11 is associated with space radio radiating system $12$—$12^b$ by coil 12. Coil 13 is provided by which connections to a suitable load circuit may be had when different adjustments of frequency are not properly related to the frequency characteristics of circuit 12, $12^a$, $12^b$. Coil 13 is inductively coupled with the fluid cooled inductance 5 and connected to any suitable load circuit such as a wired radio circuit or an antenna ground circuit connected to the loads 14. If however the auxiliary inductance 11 is connected through switches 9 and 10 and tuned by means of condenser 8 across the fluid cooled inductance 5, the radio frequency coupling may be established through coupling coil 12 to the antenna ground system $12^a$—$12^b$, in which event the coupling coil 13 would be disconnected and not used. The cathode circuits of thermionic tubes 1 and 2 are energized from transformer 22 the latter of which is associated with any suitable source of alternating current. Capacities 23 are provided as by-paths for high frequency energy to ground $12^b$. A source of control electrode biasing potential 17 supplies the proper potential to the respective control electrodes to insure the desired operational characteristics. Thermionic tubes 1 and 2 are connected in an electrically balanced circuit arrangement, inductance 18 and capacity 27 constituting the input circuits and inductances 5—9 and capacity 8 constituting the output circuits. The circuits are electrically balanced by balancing condensers 20 and 21 which provide means for counterbalancing or neutralizing unlike characteristics of the circuits. The input circuit of thermionic tubes 1 and 2 are associated with any suitable source of high frequency energy 19 by means of condensers 25 and 26. Capacity 24 is provided to offer a by-path to the high frequency energy and exclude the same from source 17. Different adjustments in the frequency characteristics are obtained by opening or closing switch members 9 and 10.

Coil 5 comprises any suitable metal tubing and the inherent frequency characteristics of the inductance which it constitutes are not easily adjusted. Since the opposite ends of the coil are connected to the sockets of the therminoic tubes and a circulatory cooling liquid is flowing therethrough, it is obvious that it would be impractical to attempt to vary the length of the tubing. In the inductance system of my invention the frequency characteristics of the circuit including coil 5 may be easily adjusted to any desired value without disturbing the circulation of the cooling fluid.

I realize that many modifications of the inductance system of my invention are possible without departing from the spirit of my invention. Any suitable type of thermionic tubes may be employed and any number of such tubes may be connected in suitable circuit arrangements. Similar inductances may be employed in the input circuit when a liquid cooled inductance is necessary or so desired. It is to be understood that my invention shall not be restricted to precisely the arrangements shown in the accompanying drawings or described in the foregoing specification but only as defined by the scope of the appended claims.

What I claim as new and desire to secure by Letters Patent of the United States is as follows:

1. An inductance system comprising in combination a metallic member of helical form providing a double passage for the circulation of liquid, a load circuit inductively coupled with said metallic member, a path to ground, having low impedance to radio frequency currents, said path being connected with said metallic member intermediate the ends thereof for defining the electrical center therein and means provided at the electrical center of the inductance whereby said liquid may be admitted to said passage.

2. An inductance system comprising a helix, said helix comprising a double passage for cooling fluid and a common passage for electrical energy, a cooling fluid inlet and discharge connection along said helix and means including a radio frequency path to ground from a point along said helix for establishing the electrical center of said helix at said fluid inlet and discharge connections.

3. An inductance system comprising a helix, said helix comprising a dual passage conductor for cooling fluid, a common passage for electrical energy, means for establishing a high frequency voltage node at the electrical center of said helix for reducing the high frequency voltage to a minimum at said electrical center of said helix including a radio frequency path to ground and a connecting member provided at the electrical center of said helix for admitting and discharging cooling fluid.

4. In an inductance system the combination of a helix, said helix comprising metal tubing having a double passage for the circulation of a cooling fluid means provided at the electrical center of said helix for admitting said fluid to said passages and a path to ground through a condenser connected to the electrical center of said helix for maintaining the radio frequency potential at the point of admission of the cooling fluid to the passages in said helix at a minimum.

5. An inductance system comprising in combination a plurality of lengths of metal tubing immediately adjacent to each other comprising a single electrical conductor and comprising a plurality of conductors for the circulation of a liquid, and a path to ground having a low radio frequency impedance connected to said lengths of metal tubing intermediate the ends thereof for fixing the electrical center of said tubing and maintaining the radio frequency potential at the point of admission and discharge of the liquid to the conductors at a minimum.

6. An inductance coil comprising a helical formation of metallic tubing providing a plurality of individual fluid conducting passages immediately adjacent to each other and constituting a single electrical conductor, fluid inlet and discharge connections for said tubing intermediate the ends of said coil, an electrical circuit connected between said fluid inlet and discharge connections and the ground, said circuit including a low impedance path to radio frequency currents and operating to maintain the electrical center of said metallic tubing at minimum radio frequency potential.

7. An inductance coil comprising a helical formation of metallic tubing having a plurality of individual fluid conducting passages and a single electrical passage, a path to ground extending between the metallic tubing at a point intermediate the ends thereof and a low radio frequency impedance in said path for defining the electrical center of said coil, and fluid connecting members associated with said coil at the electrical center thereof.

8. A high frequency inductance system comprising a helical formation of metallic tubing means for associating a cooling fluid with said tubing at the electrical center of the inductance, and an electrical circuit connected to said tubing at a point intermediate the ends thereof, said circuit including a radio frequency path to ground for maintaining said tubing at a low radio frequency potential at the point of connection of said circuit thereto and defining the electrical center thereof.

9. An inductance system comprising in combination a metallic member of helical form providing a double passage for the circulation of cooling fluid, a load circuit, means for inductively coupling said load circuit with said helical metallic member, means for defining the potential of the electrical center of said inductance including a radio frequency path to ground, and means for admitting and discharging cooling fluid at the electrical center of said inductance.

10. An inductance system comprising a metallic member of helical form providing a double passage for the circulation of cooling fluid, a load circuit, an inductance coil adapted to be electrically connected in parallel with said metallic member, means for conjointly tuning said metallic member and said inductance, a radio frequency path to ground connected to said metallic member intermediate the ends thereof for establishing the electrical center of said metallic member, fluid inlet and discharge connections for said metallic member at said electrical center, and independent means inductively coupled to said metallic member and to said inductance for symmetrically transferring energy from said metallic member to said load circuit.

11. A high frequency inductance system comprising in combination a metallic member of helical form providing a double passage for the circulation of cooling fluid, a load circuit, an inductance conductively connected with said metallic member of helical form, means for conjointly tuning said inductance and said member, separate means inductively coupled to said member and to said inductance and adapted to be electrically connected with said load circuit, means including a radio frequency path to ground for maintaining the electrical center of said metallic member at minimum radio frequency potential and means for introducing cooling fluid at the minimum radio frequency potential point along said metallic member.

12. A high frequency inductance system comprising in combination a metallic member of helical form providing a double passage for the circulation of cooling fluid, a load circuit, an inductance conductively connected with said metallic member, means for conjointly tuning said inductance and said member, separate means inductively coupled to said member and to said inductance and adapted to be electrically connected with said load circuit, a low impedance radio frequency path to ground connected to the electrical center of said metallic member for maintaining the electrical center of said metallic member at minimum radio frequency potential and means for introducing and discharging cooling fluid from said metallic member at said position of minimum radio frequency potential along the electrical center thereof.

LOUIS A. GEBHARD.